US012618711B2

(12) United States Patent
Walter et al.

(10) Patent No.: US 12,618,711 B2
(45) Date of Patent: May 5, 2026

(54) SINGLE PHOTON DETECTOR DEVICE FOR DETECTING AN OPTICAL SIGNAL

(71) Applicant: PIXEL PHOTONICS GMBH, Münster (DE)

(72) Inventors: Nicolai Walter, Münster (DE); Wolfram Pernice, Münster (DE); Fabian Beutel, Münster (DE); Wladick Hartmann, Münster (DE); Martin Wolff, Münster (DE)

(73) Assignee: PIXEL PHOTONICS GMBH, Münster (DE)

( * ) Notice: Subject to any disclaimer, the term of this patent is extended or adjusted under 35 U.S.C. 154(b) by 91 days.

(21) Appl. No.: 18/293,986

(22) PCT Filed: Jul. 28, 2022

(86) PCT No.: PCT/EP2022/071278
§ 371 (c)(1),
(2) Date: Jan. 31, 2024

(87) PCT Pub. No.: WO2023/012039
PCT Pub. Date: Feb. 9, 2023

(65) Prior Publication Data
US 2025/0076110 A1      Mar. 6, 2025

(30) Foreign Application Priority Data

Aug. 2, 2021    (DE) ..................... 10 2021 119 979.4

(51) Int. Cl.
*G01J 1/44* (2006.01)
*G01J 1/04* (2006.01)

(52) U.S. Cl.
CPC .............. *G01J 1/44* (2013.01); *G01J 1/0425* (2013.01)

(58) Field of Classification Search
CPC ........... G01B 11/0675; G01B 9/02091; G01M 11/0228; G01J 1/44; G01J 1/0425
See application file for complete search history.

(56) References Cited

U.S. PATENT DOCUMENTS

2019/0189816 A1    6/2019  Najafi
2020/0303573 A1    9/2020  Najafi
(Continued)

FOREIGN PATENT DOCUMENTS

GB          2588330          4/2021

OTHER PUBLICATIONS

Höpker, J.P., et al., "Integrated superconducting nanowire single-photon detectors on titanium in-diffused lithium niobate waveguides", Arxiv.Org, Cornell University Library, 201 Olin Library Cornell University Ithaca, NY 14853, Apr. 26, 2021.

*Primary Examiner* — Georgia Y Epps
*Assistant Examiner* — Don J Williams
(74) *Attorney, Agent, or Firm* — DUANE MORRIS LLP; Gregory M. Lefkowitz; Daniel J. Tarr

(57) ABSTRACT

The invention relates to a single photon detector device (10) for detecting an optical signal (36), comprising at least one optical waveguide (12) and a nanowire (18), wherein: the at least one waveguide (12) is designed to guide the optical signal (36) along an optical axis (14) in two opposing directions (16a, 16b); the nanowire (18) is curved at least in some parts within a region (20) defined by the at least one waveguide (12); the nanowire (18) is shaped in such a way that within a region (20) defined by the at least one waveguide (12) the nanowire (18) a) is substantially mirror-symmetrical with respect to a plane (24) perpendicular to the optical axis (14), or b) is substantially point-symmetrical with respect to a point (26) within the region (20) defined by the at least one waveguide (12); within the region (20) defined by the waveguide (12) deviations of up to ±5% in (Continued)

each spatial direction and/or of up to ±10 μm along the optical axis are possible.

9 Claims, 3 Drawing Sheets

(56)                   References Cited

U.S. PATENT DOCUMENTS

| | | |
|---|---|---|
| 2020/0333179 A1 | 10/2020 | Chung |
| 2021/0381884 A1* | 12/2021 | Walter .................. G01J 1/0425 |

* cited by examiner

SINGLE PHOTON DETECTOR DEVICE FOR DETECTING AN OPTICAL SIGNAL

CROSS-REFERENCE TO RELATED APPLICATIONS

This application is a § 371 national stage entry of International Application No. PCT/EP2022/071278, filed on Jul. 28, 2022, which claims priority to German Patent Application No. 10 2021 119 979.4, filed on Aug. 2, 2021, the entire contents of which are incorporated herein by reference.

The invention relates to a single photon detector device for detecting an optical signal, comprising at least one optical waveguide and a nanowire.

Waveguide-integrated superconducting photon detectors, and in particular their subtype superconducting nanowire single photon detectors (SNSPDs), highly efficiently detect broadband light which propagates in a waveguide on which they are integrated. SNSPDs have a nanowire as the actual detector element, said nanowire being superconducting at sufficiently low temperatures.

Figure 1:
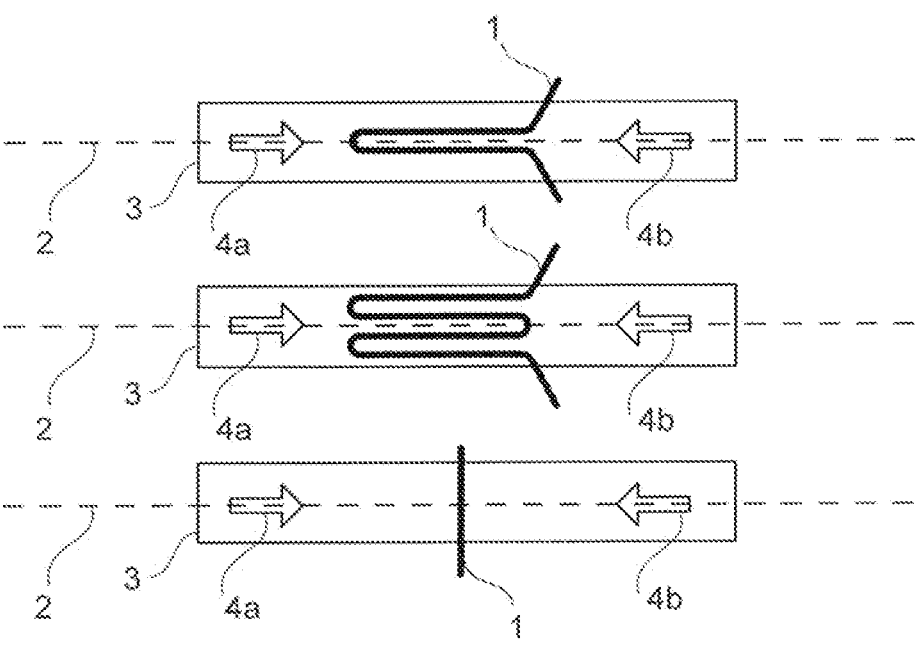

In the case of SNSPDs known in the prior art, as are illustrated in FIG. 1, the nanowire 1 extends either in a U-shape or W-shape along an optical axis 2 of the waveguide 3. By virtue of the nanowire 1 extending along the optical axis 2, the absorption of the light guided in the waveguide 3 by the nanowire 1 is dependent on the length thereof, such that the absorption of the nanowire 1 and thus the efficiency of the detector can be defined by the length of the nanowire 1. These shapings have the disadvantage, however, that the efficiency of the SNSPD varies depending on the direction 4a, 4b from which the light is guided in the waveguide 3.

SNSPDs having I-shaped nanowires 1 extending perpendicular to the optical axis 2 are additionally known in the prior art. However, on account of their extending perpendicular to the optical axis 2, these nanowires have only very low absorption, and so these SNSPDs do not allow highly efficient detection of light.

Taking this as a departure point, it is an object of the invention to provide a single photon detector having a reduced difference in the detection efficiency for light having different propagation directions. In particular, it is an object of the invention to provide a single photon detector which detects light from different propagation directions with substantially equivalently high efficiency.

This object is achieved by means of the features of the independent patent claim. Preferred developments are found in the dependent claims.

The invention thus provides a single photon detector device for detecting an optical signal, comprising at least one optical waveguide and a nanowire, wherein the at least one waveguide is designed to guide the optical signal along an optical axis in two mutually opposite directions, wherein the nanowire is at least partly curved within a region defined by the at least one waveguide, and wherein the nanowire is shaped in such a way that within the region defined by the at least one waveguide the nanowire a) is substantially mirror-symmetrical relative to a plane perpendicular to the optical axis, or b) is substantially point-symmetrical relative to a point within the region defined by the at least one waveguide, wherein within the region defined by the waveguide deviations from symmetry of up to ±5% in each spatial direction and/or of up to ±10 μm along the optical axis are possible.

The heart of the invention is to shape the nanowire within the region defined by the waveguide in a specific shape having at least one curvature and a substantially mirror-symmetrical or substantially point-symmetrical design. This makes it possible, firstly, that the single photon detector device can highly efficiently detect the optical signal guided in the waveguide and, secondly, that the differences in the efficiency with which the single photon detector device detects the optical signal depending on the propagation direction of the optical signal are greatly reduced. Particularly preferably, the single photon detector device can detect the optical signal with substantially the same efficiency independently of the propagation direction of said optical signal. In other words, the single photon detector device does not have a preferred direction in which the optical signal is detected with higher efficiency, as is the case in the prior art.

The waveguide of the single photon detector device is designed in such a way that the optical signal can propagate along the optical axis of the waveguide. In this case, it is provided that the optical signal can propagate in the two mutually opposite directions along the optical axis. The optical waveguide is preferably a planar optical waveguide structure that is used in integrated optics. In principle, the nanowire can be applied on the optical waveguide, can be integrated into the waveguide, or can be arranged in the optical near field of the waveguide, preferably at a distance of not more than 1 μm from the optical waveguide, with respect to the optical waveguide. Particularly preferably, the nanowire is integrated into the waveguide structure directly during production of the waveguide that is shaped on a chip.

The nanowire has a specific shape within the region defined by the at least one waveguide. Within the meaning of the invention, region defined by the waveguide is taken to mean a spatial region whose proportions correspond to the dimensions of the waveguide. By way of example, the nanowire can extend transversely with respect to the optical axis of the waveguide and can be longer than the width of the waveguide such that the nanowire projects at the sides of the waveguide. In this example, therefore, a part of the nanowire, namely that which crosses the waveguide, lies within the region defined by the waveguide. The portion of the nanowire which projects at the sides of the waveguide lies outside the region defined by the waveguide.

The portion of the nanowire which lies outside the region defined by the waveguide can assume an arbitrary shape. The portion of the nanowire which lies within the region defined by the waveguide is at least partly curved. This means that the nanowire has at least one curvature in this region. This makes it possible that the nanowire can be guided at least partly parallel to the optical axis of the waveguide, such that the single photon detector device has a very high efficiency and can detect even very small optical signals—preferably in the range of a single photon or in the range of a few photons.

Furthermore, it is provided that within the region defined by the waveguide the nanowire a) is substantially mirror-symmetrical relative to the plane perpendicular to the optical axis, or b) that the nanowire is substantially point-symmetrical relative to the point within the region defined by the waveguide, wherein within the region defined by the waveguide deviations from symmetry of up to ±5% in each spatial direction and/or of up to ±10 μm along the optical axis are possible.

With regard to a) the shape of the nanowire within the region defined by the waveguide is therefore such that there is a mirror plane perpendicular to the optical axis of the waveguide, by which the shape of the nanowire within the region defined by the waveguide is mapped onto itself by means of mirroring at the mirror plane. In this case, however, deviations from mirror symmetry are possible within two tolerance ranges, specifically by up to ±5% in each spatial direction and/or up to ±10 μm along the optical axis. Relative to the first tolerance range, this means in other words that an arbitrary point of the nanowire can deviate by up to ±5% from the point predefined by the mirror symmetry, specifically in each spatial direction. In this case, the percentage indication relates to the distance of the point perpendicular to the mirror plane. Therefore, if a point of the nanowire should be at a distance of 100 μm from the mirror plane on account of the mirror symmetry, for example, the first tolerance range makes it possible that the corresponding point can be situated in a sphere having a diameter of 5 μm (corresponding to 5% of 100 μm) around the point predefined by the mirror symmetry. Independently of this first tolerance range, an arbitrary point of the nanowire can deviate by up to ±10 μm from the point predefined by the mirror symmetry along the optical axis of the waveguide. Therefore, if a point of the nanowire should be at a distance of 150 μm from the mirror plane on account of the mirror symmetry, for example, the second tolerance range makes it possible that the corresponding point can be situated at a distance in a range of 140 μm to 160 μm from the mirror plane. Within these deviations from mirror symmetry, it is still possible that the single photon detector device can detect the optical signal with the same efficiency independently of the propagation direction of said optical signal.

With regard to b) the shape of the nanowire within the region defined by the waveguide is therefore such that there is a point of symmetry within the region defined by the waveguide, by which the shape of the nanowire within the region defined by the waveguide is mapped onto itself by means of mirroring at the point of symmetry. In this case, too, deviations from point symmetry are possible within two tolerance ranges, specifically by up to ±5% in each spatial direction and/or up to ±10 μm along the optical axis. Relative to the first tolerance range, this means in other words that an arbitrary point of the nanowire can deviate by up to ±5% from the point predefined by the point mirroring, specifically in each spatial direction. In this case, the percentage indication relates to the distance of the point with respect to the point of symmetry. Therefore, if a point of the nanowire should be at a distance of 100 μm from the point of symmetry on account of the point symmetry, for example, the first tolerance range makes it possible that the corresponding point can be situated in a sphere having a diameter of 5 μm (corresponding to 5% of 100 μm) around the point predefined by the point symmetry. Independently of this first tolerance range, an arbitrary point of the nanowire can deviate by up to ±10 μm from the point predefined by the point symmetry along the optical axis of the waveguide. Therefore, if a point of the nanowire should be at a distance of 150 μm from the point of symmetry on account of the point symmetry, for example, the second tolerance range makes it possible that the corresponding point can be situated around the point predefined by the point symmetry in a range of ±10 μm along the optical axis. Within these deviations from point symmetry, it is still possible that the single photon detector device can detect the optical signal with the same efficiency independently of the propagation direction of said optical signal.

Both designs a) and b) make it possible that the differences in efficiency with which the single photon detector device detects the optical signal depending on the propagation direction of the optical signal in the waveguide are greatly reduced. Particularly preferably, the detection efficiency is independent of the propagation direction of the optical signal in the waveguide.

With regard to feature b) it is preferably provided that the point, i.e. the point of symmetry, within the region defined by the waveguide is at equal distances from two sides of the region defined by the waveguide. In other words, it is therefore preferably provided that the point of symmetry is provided centrally in the region defined by the waveguide.

In accordance with one preferred development of the invention, it is provided that the nanowire is shaped according to feature a) and that two ends of the nanowire outside the region defined by the waveguide are on the same side of the at least one waveguide. Preferably, therefore, the nanowire does not end within the region defined by the waveguide, rather its two ends are situated outside the region defined by the waveguide. Preferably, the two ends of the nanowire are on the same side of the waveguide. This makes it particularly easy to connect each of the two ends of the nanowire to an electrode.

In this context, in accordance with a further preferred development, it is provided that the nanowire is shaped according to feature b) and that two ends of the nanowire outside the region defined by the waveguide are each on mutually opposite sides of the at least one waveguide. Even if the nanowire is designed according to feature b), it is preferably provided that the ends of the nanowire are not situated within the region defined by the waveguide, but rather outside that region. In addition, it is preferably provided that the ends of the nanowire are on mutually opposite sides of the waveguide. Preferably, it is provided in this case that the two ends of the nanowire are substantially at the same location relative to the optical axis. This simplifies the attachment of electrodes and hence the production of the single photon detector device.

Within the region defined by the waveguide the nanowire can have in principle an arbitrary shape with at least one curvature as long as the shape has either the mirror symmetry or the point symmetry described. In this context, it is preferably provided that within the region defined by the at least one waveguide the nanowire has a meandering shape, an S-shape and/or an oval shape. The S-shape is one example of a point-symmetrical shape, where the ends of the nanowire are on different sides of the waveguide. The oval shape is one example of a mirror-symmetrical shape, where the ends of the nanowire are on the same side of the waveguide. In the present case, therefore, oval shape should not be understood to mean that the two ends of the nanowire meet at a point within the region defined by the waveguide and form a closed oval, rather that two end regions of the nanowire, within the region defined by the waveguide, are spatially so close that the shape of the nanowire covers at least 75% of the circumference of a closed oval.

With regard to the tolerance range and the S-shape, it can therefore be provided, for example, that a first curvature of the S-shape, relative to a reference axis running perpendicular to the optical axis and through the point of symmetry, is 10 μm further away from this reference axis than a second curvature of the S-shape corresponding to this first curvature through the point symmetry. With regard to the tolerance range and the oval shape, it can be provided, for example, that a first curvature of the oval shape is 10 μm closer to the mirror plane than the second curvature of the oval shape corresponding to the first curvature through the mirror symmetry.

In principle, it is possible for the single photon detector device to comprise exactly one waveguide and exactly one nanowire. Alternatively, it is possible for the single photon detector device to comprise a plurality of waveguides and exactly one nanowire. In this context, in accordance with one preferred development, it is provided that the single photon detector device comprises a plurality of waveguides crossing one another, wherein the plurality of waveguides are designed to guide the optical signal along a respective optical axis in two mutually opposite directions. It can therefore be provided that exactly one nanowire is used for the plurality of waveguides crossing one another. By virtue of the plurality of waveguides which cross one another and are designed in such a way that they guide the optical signal in each case along their optical axis in the two mutually opposite directions, the single photon detector device thus has more than two propagation directions. The nanowire is preferably designed in such a way that the optical signal is detectable with the same efficiency in all propagation directions.

Furthermore, in this context, in accordance with one preferred development, it is provided that the nanowire is curved in each case within the region defined by each waveguide, and that the nanowire is shaped in such a way that in each case within the region defined by each waveguide the nanowire is mirror-symmetrical relative to a plane perpendicular to the optical axis of the respective waveguide, wherein within the region defined by each waveguide in each case deviations from symmetry of up to ±5% in each spatial direction and/or of up to ±10 μm along the respective optical axis are possible. In other words, therefore, the nanowire is curved repeatedly as viewed over its entire length and has the mirror symmetry within each region defined by a waveguide.

With regard to the ends of the nanowire, in connection with the plurality of waveguides which cross one another, in accordance with one preferred development of the invention, it is provided that two ends of the nanowire are in each case on the same side of each waveguide of the plurality of waveguides. Therefore, the two ends are preferably in each case always situated on the same side of a waveguide, where this applies to all the waveguides.

Furthermore, it is preferably provided that the nanowire is shaped in such a way that within all regions defined by the respective waveguides the nanowire is substantially mirror-symmetrical relative to a global mirror plane, wherein deviations from the global mirror symmetry of up to ±5% in each spatial direction and/or of up to ±10 μm along the respective optical axis of the waveguide are possible. Therefore, provision is preferably made not only for the nanowire to exhibit mirror symmetry only locally at the region defined by one waveguide, but also for the nanowire to exhibit mirror symmetry in terms of the shape of the nanowire within all regions defined by the waveguides.

In connection with the waveguides which cross one another, in accordance with one preferred development of the invention, it is provided that the plurality of waveguides cross one another in a common region. By way of example, three waveguides which cross one another form the shape of a star. In this way, it is possible to detect optical signals from a plurality of propagation directions using one nanowire.

One difficulty for a single photon detector device comprising at least one waveguide and a nanowire is that the optical signal has to be incoupled into the waveguide. The couplers used for the incoupling of the optical signal generally have different efficiencies during incoupling for differently polarized portions of the optical signal. Accordingly, in order that the highest possible proportion of the optical signal is incoupled into the waveguide, it is necessary to monitor the polarization of the optical signal prior to incoupling into the waveguide, which requires additional optical components. In connection with dispensing with the monitoring of the polarization of the optical signal prior to incoupling into the waveguide, in accordance with one preferred development of the invention, it is provided that the single photon detector device comprises a coupler, wherein the coupler is connected to two ends of the at least one waveguide and is designed in such a way that the optical signal is able to be incoupled into different ends of the at least one waveguide depending on its polarization, and wherein the nanowire is arranged in a region between the two ends of the at least one waveguide. By virtue of the fact that the single photon detector device can detect the optical signal with the same efficiency independently of the propagation direction of said optical signal, a coupler which incouples the optical signal into the different ends of the same waveguide depending on the polarization of said optical signal makes it possible to provide a polarization-independent single photon detector device. The latter has the advantage that in applications with a high number of channels, with the same efficiency for both polarization directions of the optical signal, the required number of detectors can be reduced since only one polarization-independent single photon detector device has to be used for both polarization directions. Preferably, provision can be made here for deviations from mirror symmetry or deviations from point symmetry in the tolerance ranges described to be used in the case of the nanowire in order to compensate for different absorptions of the nanowire in relation to the two polarization directions and in this way to detect the optical signal with the same efficiency independently of the propagation direction of said optical signal.

In accordance with a further preferred development of the invention, it is provided that the nanowire is applied on the optical waveguide or is integrated into the waveguide. Preferably, the single photon detector device is therefore a single photon detector device which is able to be realized using conventional production methods from the CMOS industry (complementary metal oxide semiconductor; semiconductor process for fabricating integrated digital and/or analog semiconductor components).

Furthermore, it is preferably provided that the nanowire has a substantially rectangular cross-section, wherein the thickness of the nanowire is such that a superconducting current can be conducted through the nanowire. Preferably, the thickness of the nanowire is between 3 nm and 20 nm. With further preference, the width of the nanowire is between 10 nm and 2000 nm, preferably between 20 nm and 500 nm. During the production process the thickness of the nanowire can be influenced by the thickness of the superconducting layer that is deposited. After deposition the layer can be patterned for example by means of electron beam lithography and plasma-enhanced etching methods, wherein the width of the nanowire can be determined in the process. In addition, it is furthermore preferably provided that a length of the nanowire—measured from one end of the nanowire to the other end of the nanowire—is at least five times greater than the width of the nanowire.

With regard to the material of the nanowire, it is preferably provided that the nanowires comprise at least one of the materials from the group comprising Nb, NbN, NbTi, NbTiN, $Nb_3Ge$, $Nb_3Sn$, $SmFeAsO_{1-x}F_x$, CeOFeAs, $MgB_2$, $W_xSi_{1-x}$, MoRe, MoSi, TaN, graphene, iron-containing high-temperature superconductors (iron pnictides), and high-temperature superconductors comprising copper oxide, in particular YBCO and/or BSCCO. The nanowire can consist of one of the materials or a plurality of materials in any desired combination. It can alternatively or additionally also consist of further superconducting materials.

The invention is explained by way of example below on the basis of preferred exemplary embodiments with reference to the drawing.

Figure 2:
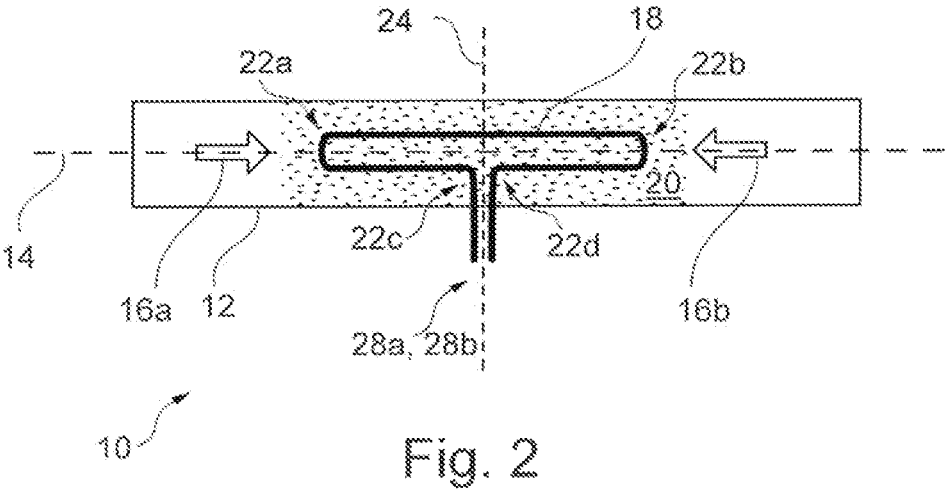
Figure 3:
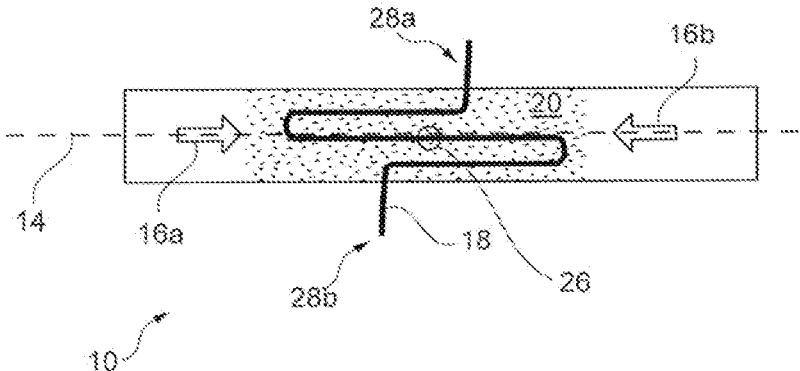
Figure 4:
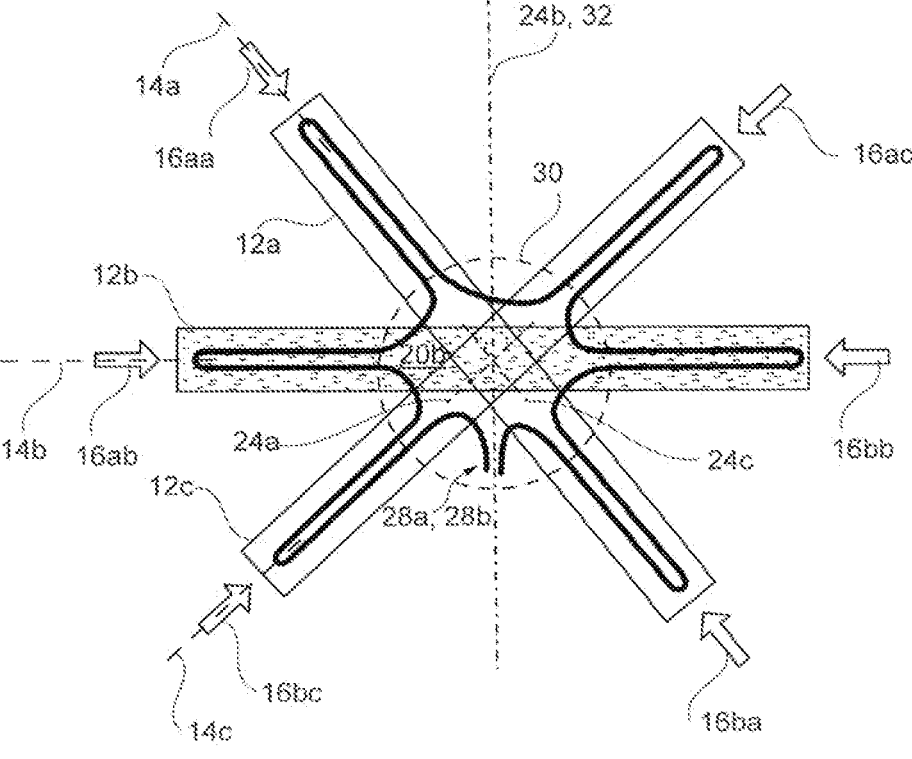
Figures 5, 6:
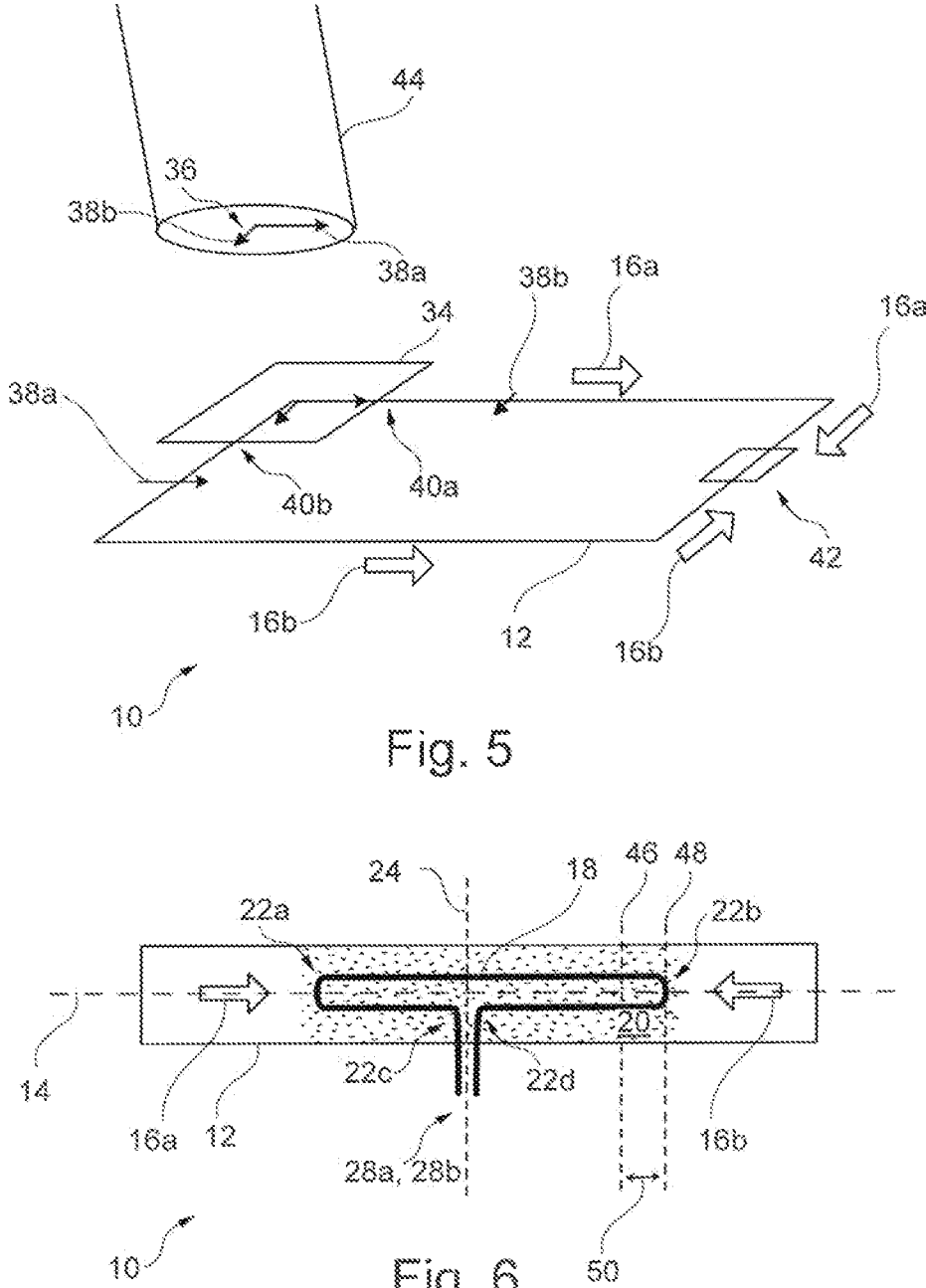

In the drawing:

FIG. 1 shows schematic illustrations of a single photon detector device as known in the prior art, FIG. 2 shows a schematic illustration of a single photon detector device, in accordance with one preferred embodiment of the invention, FIG. 3 shows a schematic illustration of a single photon detector device, in accordance with a further preferred embodiment of the invention, FIG. 4 shows a schematic illustration of a single photon detector device, in accordance with a further preferred embodiment of the invention, FIG. 5 shows a schematic illustration of a single photon detector device comprising a coupler, in accordance with a further preferred embodiment of the invention, and FIG. 6 shows a schematic illustration of a single photon detector device, in accordance with a further preferred embodiment of the invention.

FIGS. 2 and 3 show schematic illustrations of two preferred embodiments of a single photon detector device 10 for detecting an optical signal. The single photon detector device 10 comprises an optical waveguide 12. The waveguide 12 is designed to guide the optical signal along an optical axis 14 in two mutually opposite directions 16a, 16b. Furthermore, the single photon detector device 10 comprises a nanowire 18.

In both embodiments shown in FIGS. 2 and 3, the nanowire 18 is at least partly curved within a region 20 defined by the waveguide 12. As is evident in FIGS. 2 and 3, the nanowire 18 in both embodiments has four curvatures 22a, 22b, 22c, 22d within the region 20 defined by the waveguide 12.

In addition, the nanowire 18 in the embodiment illustrated in FIG. 2 is shaped in such a way that within the region 20 defined by the waveguide 12 the nanowire 18 is mirror-symmetrical relative to a plane 24 perpendicular to the optical axis 14. In other words, therefore, within the region 20 the shape of the nanowire 18 is mapped onto itself by the mirror plane 24. In the present case, the nanowire 18 has an oval shape within the region 20.

In the embodiment illustrated in FIG. 3, the nanowire 18 is shaped in such a way that within the region 20 defined by the waveguide 12 the nanowire 18 is point-symmetrical relative to a point 26 within the region 20 defined by the waveguide 12. In other words, therefore, within the region 20 the shape of the nanowire 18 is mapped onto itself by the point 26 of symmetry. In the present case, the nanowire 18 meanders within the region 20 and has the shape of an S.

In both exemplary embodiments shown, two ends 28a, 28b of the nanowire 18 are outside the region 20 defined by the waveguide 12. In the exemplary embodiment in FIG. 2, the two ends 28a, 28b are situated on the same side of the waveguide 12. In the exemplary embodiment in FIG. 3, the two ends 28a, 28b are each situated on mutually opposite sides of the waveguide 12, the two ends 28a, 28b being substantially at the same location relative to the optical axis 14.

FIG. 4 shows a further exemplary embodiment of the single photon detector device 10. In this exemplary embodiment, the single photon detector device 10 has a plurality of waveguides 12a, 12b, 12c—three in the present case. The three waveguides 12a, 12b, 12c cross one another in a crossing region 30. Each waveguide 12a, 12b, 12c is designed in such a way that it can propagate the optical signal along its optical axis 14a, 14b, 14c (which is depicted only for the waveguide 12b for the sake of clarity) in the two mutually opposite directions 16a, 16b, such that the single photon detector device 10 produces a total of six propagation directions, namely the directions 16aa and 16ba for the waveguide 12a, the directions 16ab and 16bb for waveguide 12b, and the directions 16ac and 16bc for waveguide 12c. In addition, each of the waveguides 12a, 12b, 12c defines a region 20a, 20b, 20c (which is depicted only for the waveguide 12b for the sake of clarity).

In the present case, the nanowire 18 is shaped in such a way that the nanowire 18 is curved in each case within each of the regions 20a, 20b, 20c, and that within each of the regions 20a, 20b, 20c the nanowire 18 is mirror-symmetrical relative to a plane 24a, 24b, 24c perpendicular to the respective optical axis 14a, 14b, 14c. In addition, in the present exemplary embodiment, the nanowire 18 is shaped in such a way that within all the regions 20a, 20b, 20c the nanowire 18 is mirror-symmetrical relative to a global mirror plane 32, which coincides with the mirror plane 24b in the present case. With regard to the ends 28a, 28b of the nanowire 18, FIG. 4 shows that the two ends 28a, 28b are each on the same side of each waveguide 12a, 12b, 12c.

FIG. 5 shows a further preferred exemplary embodiment of the single photon detector device 10. In this exemplary embodiment, the single photon detector device 10 comprises a coupler 34. The coupler 34 is designed in such a way that the optical signal 36, comprising two differently polarized portions 38a, 38b, is able to be incoupled into different ends 40a, 40b of the waveguide 12 depending on the polarization direction. Accordingly, the coupler 34 is connected to the two ends 40a, 40b of the waveguide 12. The nanowire 18 (not illustrated itself in FIG. 5) is situated in a region 42 between the two ends 40a, 40b of the waveguide 12. In addition, FIG. 5 illustrates an optical fiber 44, which guides the optical signal 36 before it is incoupled into the waveguide 12 by means of the coupler 34. By virtue of the fact that the single photon detector device 10 can detect the portions 38a, 38b of the optical signal 36, said portions propagating in opposite directions 16a, 16b, with the same efficiency independently of the propagation direction 16a, 16b, FIG. 5 shows a polarization-independent single photon detector device 10.

FIG. 6 shows a schematic illustration of a further preferred embodiment of the single photon detector device 10 for detecting an optical signal. The single photon detector device 10 is designed as in FIG. 2, but the nanowire 18 has a deviation from mirror symmetry within a tolerance range. In the region 20 defined by the waveguide 12 the nanowire 18 is designed so as to be at least partly curved and substantially mirror-symmetrical. In this case, it is readily discernible in FIG. 6 that the right-hand curvature 22b of the nanowire 18 is not at the curvature location 46 corresponding to the location of the left-hand curvature 22a by way of the mirror symmetry, but rather is offset with respect thereto at the curvature location 48. In the present case, the two curvature locations 46, 48 are at a distance of 10 μm from one another as measured along the optical axis 14, which is symbolized by the arrow 50.

LIST OF REFERENCE SIGNS

1 Nanowire (prior art)
2 Optical axis (prior art)
3 Waveguide (prior art)

4a, 4b Propagation directions (prior art)
10 Single photon detector device
12 Waveguide
14 Optical axis
16a, 16b Propagation directions
16aa, 16ba Propagation direction of waveguide 12a
16ab, 16bb Propagation direction of waveguide 12b
16ac, 16bc Propagation direction of waveguide 12c
18 Nanowire
20 Region defined by the waveguide
22 Curvature
24 Mirror plane
26 Point of symmetry
28a, 28b Ends of the nanowire
30 Crossing region
32 Global mirror plane
34 Coupler
36 Optical signal
38a, 38b Polarized portions of the optical signal
40a, 40b Ends of the waveguide
42 Region on waveguide
44 Optical fiber
46 Curvature location predefined by mirror symmetry
48 Curvature location
50 Distance between curvature location 46 and curvature location 48

We claim:

1. A single photon detector device for detecting an optical signal, comprising:
   at least one optical waveguide and a nanowire, wherein the at least one waveguide is designed to guide the optical signal along an optical axis in two mutually opposite directions, wherein the nanowire is at least partly curved within a region defined by the at least one waveguide, and wherein the nanowire is shaped in such a way that within the region defined by the at least one waveguide the nanowire
   a) is substantially mirror-symmetrical relative to a plane-perpendicular to the optical axis, or
   b) is substantially point-symmetrical relative to a point within the region defined by the at least one waveguide,
   wherein, within the region defined by the waveguide, deviations from symmetry of up to ±5% in each spatial direction and/or of up to ±10 μm along the optical axis are possible; and a coupler, wherein the coupler is connected to two ends of the at least one waveguide and is designed in such a way that an optical signal is able to be incoupled into different ends of the at least one waveguide depending on its polarization, and wherein the nanowire is arranged in a region between the two ends of the at least one waveguide.

2. The single photon detector device as claimed in claim 1, wherein the nanowire is shaped according to feature a) and wherein two ends of the nanowire outside the region defined by the waveguide are on the same side of the at least one waveguide.

3. The single photon detector device as claimed in claim 1, wherein the nanowire is shaped according to feature b) and wherein two ends of the nanowire outside the region defined by the waveguide are each on mutually opposite sides of the at least one waveguide.

4. The single photon detector device as claimed in claim 1, wherein within the region defined by the at least one waveguide the nanowire has a meandering shape, an S-shape and/or an oval shape.

5. The single photon detector device as claimed claim 1, wherein the single photon detector device comprises a plurality of waveguides crossing one another, wherein the plurality of waveguides are designed to guide the optical signal along a respective optical axis in two mutually opposite directions.

6. The single photon detector device as claimed in claim 5, wherein two ends of the nanowire are in each case on the same side of each waveguide of the plurality of waveguides.

7. The single photon detector device as claimed in claim 5, wherein the plurality of waveguides cross one another in a common region.

8. The single photon detector device as claimed in claim 1, wherein the nanowire is curved in each case within the region defined by each waveguide, and wherein the nanowire is shaped in such a way that in each case within the region defined by each waveguide the nanowire is mirror-symmetrical relative to a plane perpendicular to the optical axis of the respective waveguide, wherein within the region defined by each waveguide in each case deviations from symmetry of up to ±5% in each spatial direction and/or of up to ±10 μm along the respective optical axis are possible.

9. The single photon detector device as claimed in claim 1, wherein the nanowire is applied on the optical waveguide or is integrated into the waveguide.

* * * * *